(12) United States Patent
Haseltine et al.

(10) Patent No.: US 10,621,792 B2
(45) Date of Patent: Apr. 14, 2020

(54) FOCUS CONTROL FOR VIRTUAL OBJECTS IN AUGMENTED REALITY (AR) AND VIRTUAL REALITY (VR) DISPLAYS

(71) Applicant: Disney Enterprises, Inc., Burbank, CA (US)

(72) Inventors: Eric C. Haseltine, Silver Spring, MD (US); Michael P. Goslin, Sherman Oaks, CA (US); Joseph L. Olson, Pasadena, CA (US); James Smith, Thousand Oaks, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 15/964,349

(22) Filed: Apr. 27, 2018

(65) Prior Publication Data

US 2018/0247464 A1 Aug. 30, 2018

Related U.S. Application Data

(63) Continuation of application No. 15/202,075, filed on Jul. 5, 2016, now Pat. No. 9,996,984.

(51) Int. Cl.
*G06T 19/20* (2011.01)
*A63F 13/211* (2014.01)
(Continued)

(52) U.S. Cl.
CPC .......... *G06T 19/20* (2013.01); *A63F 13/211* (2014.09); *A63F 13/213* (2014.09); *A63F 13/25* (2014.09); *G02B 27/0093* (2013.01); *G02B 27/0172* (2013.01); *G06F 1/163* (2013.01); *G06F 3/011* (2013.01); *G06F 3/013* (2013.01);
(Continued)

(58) Field of Classification Search
None
See application file for complete search history.

(56) References Cited

U.S. PATENT DOCUMENTS 5,886,822 A 3/1999 Spitzer
2003/0030912 A1 2/2003 Gleckman et al.
(Continued)

FOREIGN PATENT DOCUMENTS

| CN | 104062769 A | 9/2014 |
| CN | 104216118 A | 12/2014 |
| CN | 105259655 A | 1/2016 |

*Primary Examiner* — Frank S Chen
(74) *Attorney, Agent, or Firm* — Patterson + Sheridan, LLP

(57) ABSTRACT

Embodiments described herein include a method for authoring content for display using an optical system comprising one or more optical elements defining a field of view relative to an optical reference point. The method comprises arranging a virtual object at a first location within an authoring environment. The virtual object is configured to be included in imagery displayed by one or more display devices of the optical system to appear in a focal plane within the field of view. The method further comprises determining, using one or more viewer parameters that control a positioning of the virtual object on the one or more display devices, that a viewer may experience discomfort when viewing the virtual object at the first location. The method further comprises displaying an alert responsive to determining that the viewer may experience discomfort.

22 Claims, 7 Drawing Sheets

(51) Int. Cl.
    *A63F 13/213*     (2014.01)
    *A63F 13/25*     (2014.01)
    *G02B 27/01*     (2006.01)
    *G06F 3/01*     (2006.01)
    *G06T 19/00*     (2011.01)
    *G02B 27/00*     (2006.01)
    *G06F 1/16*     (2006.01)

(52) U.S. Cl.
    CPC .... *G06T 19/006* (2013.01); *A63F 2300/6653* (2013.01); *G02B 2027/0178* (2013.01)

(56) References Cited

U.S. PATENT DOCUMENTS

| | | | |
|---|---|---|---|
| 2013/0113701 A1* | 5/2013 | Sasaki | G06T 15/20 |
| | | | 345/156 |
| 2013/0200157 A1 | 8/2013 | Nunnink et al. | |
| 2014/0009462 A1* | 1/2014 | McNamer | G06T 19/20 |
| | | | 345/419 |
| 2014/0118836 A1 | 5/2014 | Amitai et al. | |
| 2014/0126056 A1 | 5/2014 | Amitai et al. | |
| 2014/0152531 A1 | 6/2014 | Murray et al. | |
| 2016/0154244 A1 | 6/2016 | Border et al. | |
| 2017/0052373 A1* | 2/2017 | Memmott | G02B 27/0172 |
| 2017/0185037 A1 | 6/2017 | Lee et al. | |
| 2017/0219826 A1 | 8/2017 | Haseltine et al. | |
| 2018/0090002 A1* | 3/2018 | Arita | B60K 35/00 |
| 2019/0088021 A1* | 3/2019 | Tanaka | G06F 3/01 |

* cited by examiner

NORMAL MODE     "DAZED" MODE

FOCUS CONTROL FOR VIRTUAL OBJECTS IN AUGMENTED REALITY (AR) AND VIRTUAL REALITY (VR) DISPLAYS

CROSS-REFERENCE TO RELATED APPLICATIONS

This application is a continuation of co-pending U.S. patent application Ser. No. 15/202,075, filed Jul. 5, 2016, which is herein incorporated by reference in its entirety.

BACKGROUND

Field of the Disclosure

The present disclosure generally relates to home entertainment, and more specifically to techniques for controlling focus of virtual objects displayed using augmented reality (AR) and/or virtual reality (VR) displays.

Description of the Related Art

Computer graphics technology has significantly progressed since the first video games were developed. Relatively inexpensive 3D graphics engines now provide nearly photo-realistic interactive game play on hand-held video game, home video game, and personal computer hardware platforms costing only a few hundred dollars. These video game systems typically include a hand-held controller, game controller, or, in the case of a hand-held video game platform, an integrated controller. A user interacts with the controller to send commands or other instructions to the video game system to control a video game or other simulation. For example, the controller may include a joystick and buttons operated by the user.

While video games allow the user to interact directly with the video game system, such interactions primarily influence the graphical depiction shown on the video game device (or on a connected display), and rarely influence any other objects outside of the virtual world. That is, a user may specify an input to the video game system, indicating that the user's avatar should perform a jump action, and in response the video game system could display the user's avatar jumping. However, such interactions are typically limited to the virtual world, and any interactions outside the virtual world are limited (e.g., a hand-held gaming device could vibrate when certain actions occur).

Additionally, many hand-held gaming devices include some form of visual sensing device which may be used to capture an image or a series of images of a physical, real-world scene. The captured images can then be displayed, for instance, on a display of the hand-held gaming device. Certain devices may be configured to insert virtual objects into the captured images before the images are displayed. Additionally, other devices or applications may enable users to draw or paint particular within a captured image of a physical scene. However, as such alterations apply only to a single image of the physical scene, subsequent captured images of the physical scene from different perspectives may not incorporate the user's alterations.

SUMMARY

One embodiment described herein is an optical system comprising one or more display devices and one or more computer processors configured to transmit display signals comprising at least one virtual object for updating imagery displayed by the display devices, and to selectively defocus a focus of the virtual object.

Another embodiment described herein is a method for operating an optical system. The method comprises updating, using display signals transmitted by one or more computer processors, one or more display devices, wherein the display signals comprise at least one virtual object, and selectively defocusing, by operation of the one or more computer processors, a focus of the virtual object.

Another embodiment described herein is a computer program product for operating an optical system, the computer program product comprising a computer-readable device having computer-readable program code embodied therewith. The computer-readable program code executable by one or more computer processors to update, using generated display signals, one or more display devices, wherein the display signals comprise at least one virtual object, and selectively defocus a focus of the virtual object.

BRIEF DESCRIPTION OF THE DRAWINGS

So that the manner in which the above recited aspects are attained and can be understood in detail, a more particular description of embodiments of the disclosure, briefly summarized above, may be had by reference to the appended drawings. It is to be noted, however, that the appended drawings illustrate only typical embodiments of this disclosure and are therefore not to be considered limiting of its scope, for the disclosure may admit to other equally effective embodiments.

Figure 1:
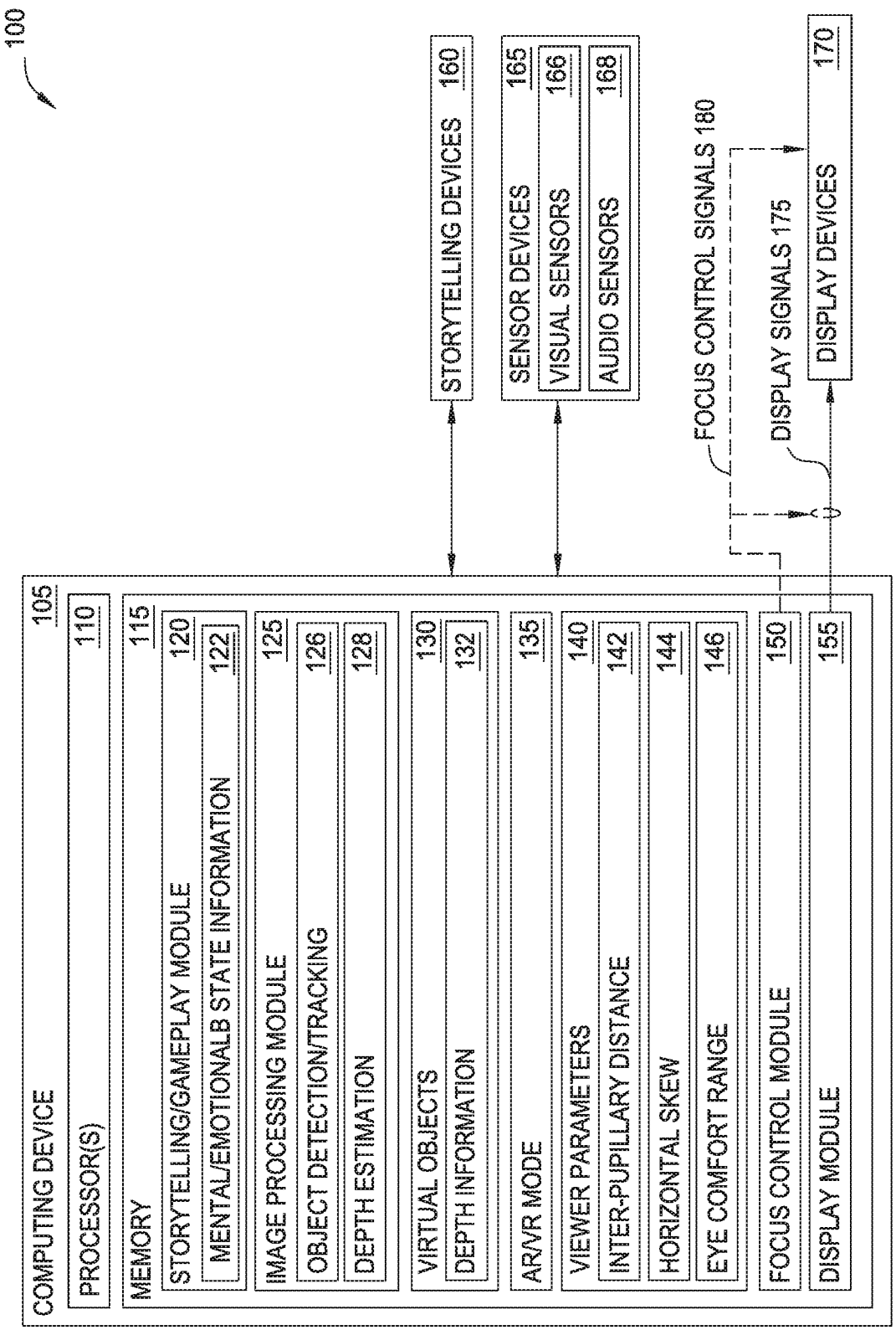
FIG. 1 is a schematic block diagram of an exemplary interactive environment, according to embodiments described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

To improve the immersive nature of an interactive environment, augmented reality (AR) and/or virtual reality (VR)

systems typically seek to depict virtual objects with perfect focus on the display devices. However, in some cases it can be advantageous to depict virtual objects without a perfect focus, such as out-of-focus, with a soft focus, etc. Depicting virtual objects without a perfect focus can create desired visual effects for the viewer, e.g., suggesting a particular mental or emotional state like a dazed state, a dream state, etc. The visual effects may also be used to suggest an extraordinary or supernatural perception for the viewer within the interactive environment.

Further, different viewers may have particular ranges for comfortably viewing virtual objects. In other words, depicting virtual objects outside of a particular eye comfort range, the depicted virtual objects may cause eyestrain or fatigue for the viewer.

Various embodiments described an optical system comprising one or more computer processors configured to transmit display signals comprising at least one virtual object for updating imagery displayed by one or more display devices. The computer processors are further configured to selectively adjust a focus of the virtual object. In some embodiments, selectively adjusting a focus of the virtual object is performed by adjusting a viewer parameter such as an inter-pupillary distance and a horizontal skew. In some embodiments, selectively adjusting a focus of the virtual object is performed by adjusting properties of one or more optical elements of the optical system, such as adjusting a distance between an eyepiece and an objective.

FIG. 1 is a schematic block diagram of an exemplary interactive environment, according to embodiments described herein. Within a system 100, a computing device 105 communicates with one or more sensor devices 165 and one or more display devices 170. As will be discussed in greater detail below, the computing device 105 may provide an augmented reality (AR) and/or virtual reality (VR) display functionality for a user in the interactive environment. The computing device 105 may be embodied in any suitable form. In some embodiments, the computing device 105 is a body-worn computing device, e.g., integrated into an assembly worn on the head, arm, etc. of a user. In some embodiments, the computing device 105 comprises a mobile computing device, such as a smartphone, tablet, etc. In some embodiments, the mobile computing device is configured to physically and removably attach with a body-worn assembly.

Computing device 105 comprises, without limitation, one or more processors 110 and memory 115. The processors 110 generally retrieve and execute programming instructions stored in the memory 115. Processors 110 are included to be representative of a single central processing unit (CPU), multiple CPUs, a single CPU having multiple processing cores, graphics processing units (GPUs) having multiple execution paths, and the like. The memory 115 is generally included to be representative of a random access memory, but may further include non-volatile storage of any suitable type(s).

Memory 115 generally includes program code for performing various functions related to generating and maintaining the storytelling, gameplay, or other interactive environment. The program code is generally described as various functional "modules" within memory 115, although alternate implementations may have different functions and/or combinations of functions.

Within memory 115, a storytelling/gameplay module 120 is generally configured to control a storytelling, gameplay, or other interactive experience that is displayed to a viewer via display devices 170. In some embodiments, the storytelling/gameplay module 120 is in the form of an application, such as a video game.

In some embodiments, the storytelling/gameplay module 120 is configured to generate a story using a selected predetermined story template (e.g., stored in memory 115), and based on a number of identified storytelling devices 160 that are available for participating in the storytelling experience. The storytelling devices 160 can be identified using a registration process performed by any suitable methods of communication. One non-limiting example includes a controller device (which may be a designated storytelling device 160 or the computing device 105) emitting a first signal such as an infrared (IR) signal, and other storytelling devices 160 transmitting a response signal such as a radio frequency (RF) signal in response to receiving the first signal.

Generally, a story may be generated by mapping predetermined actions that are associated with a selected story template to the available storytelling devices 160. For example, a particular story template can specify an initial mapping of storytelling device roles to specific actions, and the computing device 105 maps those actions onto available storytelling devices 160 that match the specified roles. The predetermined actions associated with the story are generally responsive to detecting particular stimulus events, and can include any suitable sensory outputs for generating the storytelling environment. The stimulus events may be based on the communication of coded infrared signals, sensor devices included within the storytelling devices (such as an inertial measurement unit), and so forth.

Some non-limiting examples of the predetermined actions include movement (e.g., displacement and/or vibration, articulation of elements) of the storytelling devices 160 responsive to a stimulus event, and generating audio outputs such as distinctive sound effects and/or speech. For example, a Hulk® action figure could be configured to perform an action after receiving a coded infrared signal corresponding to a "repulsor ray" hit from an Iron Man® action figure. The determined action performed by the storytelling device can be based on a history of interactions, such as how many hits the action figure has previously received. As an example, for the first repulsor ray hit, the Hulk® action figure could be configured to output a prerecorded roaring sound (e.g., using one or more speakers associated with the action figure). Upon receiving a second repulsor ray hit, the Hulk® action figure could be configured to manipulate its arms and head, in addition to outputting a roaring sound. After receiving a third repulsor ray hit, the Hulk® action figure could be configured to rock back and forth, and after receiving a fourth repulsor ray hit, the Hulk® action figure could be configured to fall over (i.e., to topple from an initial standing position) on the table.

The sensor devices 165 may be of any suitable type(s) and configured to sense information from the environment. Some non-limiting examples of sensor devices 165 include visual sensors 166, audio sensors 168, pressure sensors, acceleration sensors, and temperature sensors. The visual sensors 166 generally include cameras configured to sense visible light and/or infrared light. The audio sensors 168 generally include microphones. In some embodiments, the sensor devices 165 may be included with (or within) the computing device 105. For example, where the computing device 105 is a smartphone or tablet device, the sensor devices 165 may include camera(s), inertial motion units (IMUs), etc. that included within the smartphone or tablet device. In some embodiments, the sensor devices 165 comprise sensors that are external to the computing device 105, e.g., a visual sensor 166 included with a head-worn device.

The memory 115 further includes an image processing module 125 configured to perform processing of image information captured by the visual sensors 166. The image processing module 125 may include any number of image processing functions, such as an object detection and tracking sub-module 126 configured to detect physical objects within the interactive environment (e.g., based on edge detection information, color information, and/or other suitable features) and to track the relative location of detected objects over time (e.g., as a user and/or the objects move throughout the interactive environment). The image processing module 125 further includes a depth estimation sub-module 128 configured to dynamically estimate a distance of the detected objects from the viewer. The correct estimation of detected objects can be important so that generated augmented reality (AR) objects are displayed at a correct depth (i.e., relative to the physical objects detected in the environment).

The display devices 170 generally include one or more visual displays of any suitable type. Some non-limiting examples of suitable visual displays include light emitting diode (LED), organic LED (OLED), liquid crystal display (LCD) including a super-twisted nematic (STN) LCD, plasma, electroluminescence (EL), electronic ink (e-ink), or other display technology.

In some embodiments, a body-worn assembly includes the display devices 170. In some cases, display devices 170 comprise a single display configured to be viewed by both eyes of the viewer. In other embodiments, display devices 170 comprise one or more displays that are each configured to be viewed by a single eye of the viewer.

The display devices 170 are configured to display images (or "virtual imagery") within a field of view of the optical system. In some embodiments, however, some or all of the display devices 170 are disposed outside of the field of view and the displayed images are coupled into the field of view using a beam-splitter or other suitable optical arrangement. One example arrangement is illustrated with respect to FIG. 3 and is described below. Based on the properties of the display devices and the beam-splitter or other optical elements, the display images appear in a first focal plane within the field of view.

Figure 2:
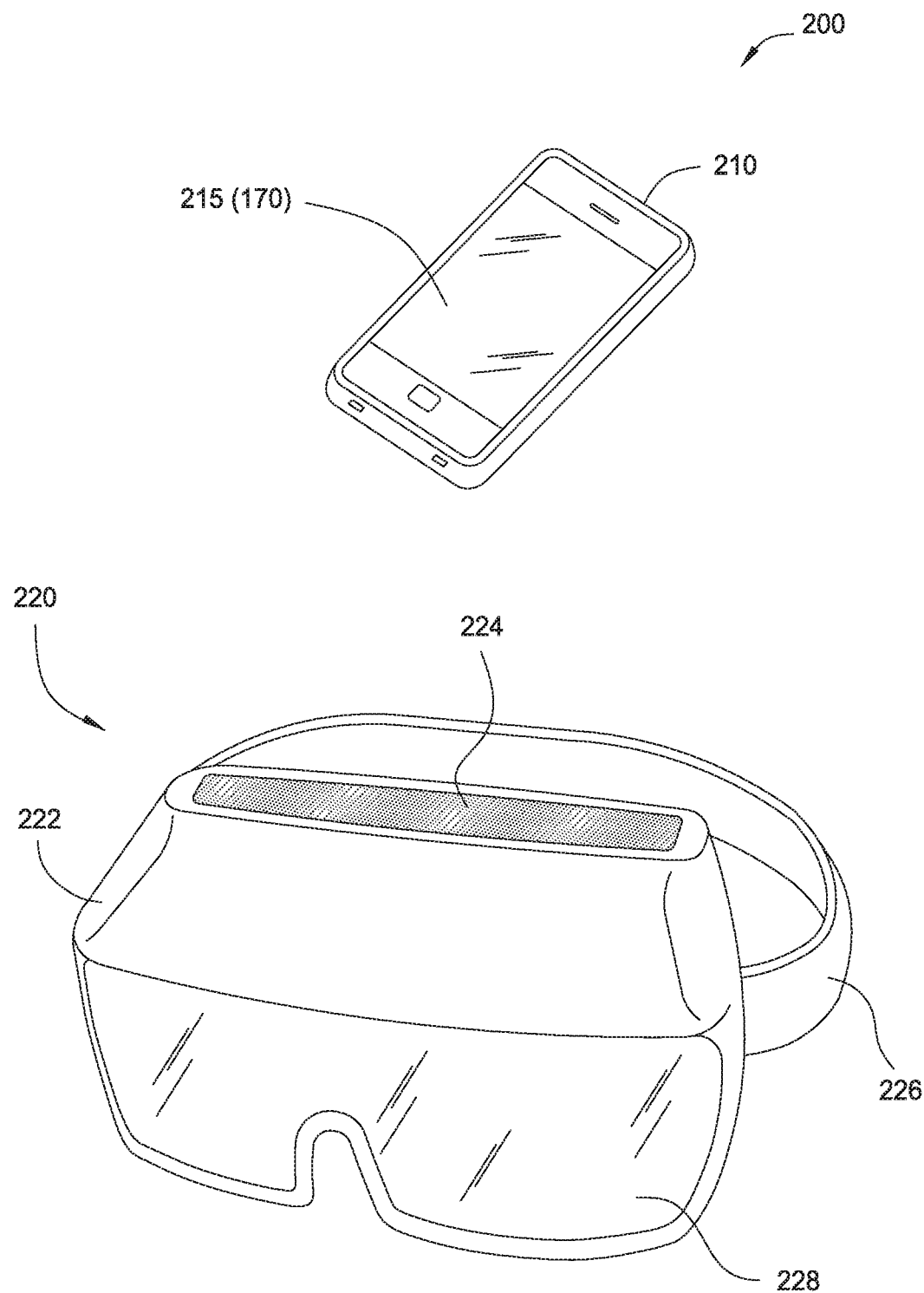
FIG. 2 is a diagram illustrating an augmented reality (AR)/virtual reality (VR) headset configured to interact with a mobile device, according to embodiments described herein.

In some embodiments, the display devices 170 are included within the computing device 105 (e.g., a main display screen of the smartphone, tablet device, etc.). As discussed above, the computing device 105 may be configured to physically and removably attach with a body-worn device such as a headset. FIG. 2 illustrates one example implementation of a headset. The attachment of the computing device 105 with the body-worn device can provide the display devices 170 with a desired orientation relative to the beam-splitter (or other optical elements) and to the viewer for producing the virtual imagery. In other embodiments, the display devices are separate from the computing device 105, e.g., a separate display integrated into the body-worn device.

In another example, the display devices 170 may be integrated into other devices that are carried or handled by the viewer, or having any other suitable viewer interaction during the storytelling or gameplay experience. For example, while participating in an example gameplay experience, the viewer can carry a toy blaster weapon that includes an optical sight for aiming, and the display devices 170 may be integrated in the optical sight.

Content displayed on the display devices 170 is controlled based on display signals 175 produced by a display module 155 of the computing device 105. The display signals 175 include information causing one or more virtual objects 130 to be displayed using the display devices 170. Each of the virtual objects 130 is associated with positional information, such as depth information 132, to determine a desired placement within the interactive environment. The positional information may be dynamically updated to reflect movement of the virtual objects 130 and/or the viewer. For embodiments providing an augmented reality (AR) interactive environment, the depth information 132 is important for placing virtual objects 130 relative to the physical objects that are sensed within the environment.

The memory 115 stores one or more viewer parameters 140 that are used to control the positioning of displayed virtual objects 130 on the display devices 170. Generally, the orientation of the viewer's eyes relative to the depicted virtual objects 130 can affect the viewer's interactive experience in a number of different ways, e.g., while the viewer wears an associated body-worn device. For instance, a viewer may experience discomfort when wearing a headset that is not properly visually calibrated for the viewer. As an example, the headset may fit the viewer properly, but the viewer's eyes may not properly align to the depicted virtual objects 130 due to the viewer having a greater or lesser inter-pupillary distance 142 (i.e., the distance between the viewer's eyes), relative to the body-worn device's default configuration. Such a misalignment may also affect the alignment of the depicted virtual objects 130, relative to physical objects within the physical environment. That is, the display module 155 may render virtual objects 130 at certain positions based on an assumption of a proper alignment with the viewer's eyes. However, due to the viewer's eyes being misaligned, the virtual objects 130 may in fact appear in different positions, relative to physical objects in the physical environment, when viewed by the viewer. Misalignment can also cause parallax errors and other optical aberrations (e.g., barrel distortion, pincushion distortion, etc.) of the virtual objects 130 when viewed by the viewer. This in turn can affect the viewer's enjoyment of the augmented reality headset, as virtual objects 130 may appear to the viewer as located in unrealistic positions (e.g., overlapping with physical objects, standing off from physical surfaces, etc.) and as having unrealistic shapes. In some embodiments, the inter-pupillary distance 142 for a particular viewer may be determined based on a calibration component executing on the computing device 105, which provides an interface through which the viewer can adjust the positioning of reference markers displayed using the display devices 170.

The viewer parameters 140 further includes one or more values of horizontal skew 144 reflecting a range of distances from the viewer's eyes at which the displayed virtual objects 130 feel comfortable to the viewer. The values of horizontal skew 144 may further be based on the configuration of the body-worn device, e.g., the focal planes that are produced by the particular arrangement of the display devices 170. For example, when a computed depth of a virtual object 130 (e.g., depth information 132) differs substantially from the optical depth of the focal plane (either much closer or much further), the viewer may experience eyestrain. In this case, the eyestrain does not arise from issues with image fusion, but a difference between where the viewer's eye wants to focus and where the eye muscles converge.

The viewer parameters 140 further includes an eye comfort range 146 comprising depth values for displaying virtual objects 130 that are comfortable for a viewer. For example, when a depth of a virtual object 130 differs too much from optical depth of image plane, eyestrain may occur for the viewer due to a difference between where eye wants to focus and where the eye muscles converge. In some embodiments, the eye comfort range 146 includes at least one set of default values which corresponds to "average" viewers. In one example, the default values of eye comfort range 146 are between less than one meter (<1 m) and about three meters (3 m). In some embodiments, a set of values for the eye comfort range 146 may be determined for a particular viewer, e.g., using a process performed by the computing device 105.

In one embodiment, the display devices 170 displays an external fiducial mark, such as a bright pixel, and the viewer is prompted to move a line of a virtual image to the left or right until it aligns with the bright pixel, which corresponds to a correct inter-pupillary distance 142 for the viewer. The determined inter-pupillary distance 142 can be used to make virtual images appear in focus within the eye comfort range 146.

In an alternate embodiment, a numbered graticule or a series of vertical lines of different colors is placed at different distances relative to the external fiducial mark, which indicates the inter-pupillary distance 142 of the viewer. In this case, the viewer provides an indication to the system, such as a voice command or other input means, which line or number appears closest to the external fiducial mark for each eye.

Virtual objects 130 having a calculated depth (i.e., depth information 132) outside the eye comfort range 146 may be adapted by the computing device 105. In some embodiments, the computing device 105 changes a depth of an out-of-range virtual object 130 to within the eye comfort range 146. In some embodiments, the computing device 105 adjusts a focus of virtual objects 130 falling outside the eye comfort range 146. In some embodiments, the adaptation to virtual objects 130 may be based on a relative importance or priority of the virtual objects 130 as defined by the storytelling/gameplay module 120. For example, virtual objects 130 includes a non-player character (NPC) and a background object, each having a calculated depth falling outside the eye comfort range 146. Within the interactive experience generated using the storytelling/gameplay module 120, the viewer may be encouraged to interact with the NPC and the storytelling/gameplay module 120 assigns a greater importance or priority to the NPC relative to the background object. In this case, the NPC the computing device 105 may keep the NPC in focus and change the depth to within the eye comfort range 146, and may defocus the background object without changing its depth.

In some embodiments, the storytelling/gameplay module 120 is associated with an authoring module (not shown) configured to author or generate content to be displayed during within the interactive experience. The authoring module may be included within the computing device 105 or may be included within a separate computing device. For example, when the virtual objects 130 are emplaced within the interactive experience, if the calculated depth for one or more virtual objects 130 are outside the eye comfort range 146, the authoring module alerts the author that the virtual objects 130 will exist outside the eye comfort range 146. The authoring module is further configured to present the author with one or more options for adapting the virtual objects 130. For example, the authoring module may allow the author to remove the out-of-range virtual object 130, to change the depth of the virtual object 130, to change the focus of the virtual object 130, and/or to leave the virtual object 130 as-is.

The focus control module 150 is configured to selectively adjust a focus of one or more virtual objects 130 within the interactive environment. The focus control module 150 may employ any suitable techniques for adjusting the one or more virtual objects in and/or out of focus, such as defocusing, soft focusing, and so forth. The focus control module 150 may be further configured to visually distort the one or more virtual objects 130. The focus control module 150 is configured to generate focus control signals 180, which may be input to the display module 155 to affect the generated display signals 175 and/or operation of the display devices 170. In some embodiments, the focus control signals 180 are additionally or alternately used to adjust properties of one or more optical elements included in an associated augmented reality (AR) and/or virtual reality (VR) display. For example, the focus control signals 180 may be used to actuate the optical elements (e.g., rotate and/or displace).

Further, in some embodiments, the focus control module 150 is further configured to selectively adjust a focus of objects in the physical environment. For example, the focus control signals 180 are used to adjust one or more parameters associated with the visual sensors 166 (e.g., camera parameters).

The focus control module 150 may use mental/emotional state information 122 of the storytelling/gameplay module 120 to selectively adjust a focus of the one or more virtual objects 130. In some cases, depicting virtual objects out of perfect focus can create desired visual effects for the viewer, e.g., suggesting a particular mental or emotional state like a dazed state, a dream state, etc. According to the James-Lange theory of emotion, a corresponding emotion can be triggered in the viewer based on the perception of the associated visual effect, and therefore producing the desired visual effects may tend to increase the immersive nature of the interactive environment.

In some embodiments, the mental/emotional state information 122 comprises one or more discrete, predefined emotional states that can be experienced by or suggested to the viewer within the interactive environment, such as calm, angry, sad, and so forth. Each discrete emotional state may correspond to a certain type and/or amount of adjusted focus. For example, within a "calm" emotional state one or more virtual objects 130 may appear in focus, within an "angry" emotional state the one or more virtual objects 130 may have a first type and/or amount of defocusing, and within a "sad" emotional state the one or more virtual objects 130 may have a second type and/or amount of defocusing.

Selectively adjusting a focus of the one or more virtual objects 130 to achieve particular visual effects can also be used to suggest an altered mental consciousness of the viewer within the interactive environment. The altered consciousness may include an enhanced consciousness such as an extraordinary or supernatural perceptive ability, and/or a diminished consciousness. The altered consciousness may further include an alternate consciousness, such as a dream state suggested for the viewer.

In some embodiments, one or more virtual objects 130 displayed as part of an enhanced consciousness may be displayed as slightly out-of-focus (e.g., soft focused) to distinguish from other virtual objects 130 that are identified as existing within the viewer's "normal" consciousness. In some embodiments, the diminished consciousness of a viewer corresponds to a dazed state, which may be based on interactions with other characters or elements within the interactive environment. For example, the dazed state may be the result of another character "casting a spell" on the viewer.

In some embodiments, selectively adjusting a focus of the one or more virtual objects 130 includes one or more of changing values of inter-pupillary distance 142 and/or horizontal skew 144. In other embodiments, selectively adjusting a focus of the one or more virtual objects 130 includes performing blurring of the virtual objects 130 e.g., applying or removing one or more filtering overlays within the display signals 175.

Different emotional or mental states may correspond to different values of inter-pupillary distance 142 and/or horizontal skew 144. In some embodiments, data acquired during a calibration process (e.g., for an associated wearable device) may be used to map particular visual effects (or the corresponding emotional or mental states) to different values of inter-pupillary distance 142 and/or horizontal skew 144.

Although not shown, the computing device 105 communicates with one or more audio output devices to enhance the interactive experience for the viewer. The audio output devices may include conventional audio speakers having any suitable form factor (e.g., standalone, integrated in a stereo, headphones, etc.), as well as devices using alternative methods of producing sound perceptible by the viewer, such as bone conduction transducers in a body-worn device. In some embodiments, the audio output devices are included within the computing device 105 (e.g., speakers of the smartphone, tablet device, etc.). In other embodiments, the audio output devices are separate from the computing device 105.

In some embodiments, the computing device 105 is configured to operate in an augmented reality (AR) mode, generally configured to superimpose virtual images such as characters, objects, and/or dynamic visual effects into the field of view using display devices 170. The field of view can be determined using sensor devices 165 such as the visual sensors 166. In some embodiments, the computing device 105 is configured to operate in a virtual reality (VR) mode, generally replacing a viewer's natural view of the environment with virtual imagery using the display devices 170.

For example, within an AR mode, the display devices 170 could superimpose a virtual character to appear seated on a physical chair within the environment detected using image information acquired by the visual sensors 166. The display of the virtual character on the display device 170 is dynamically adjusted based on the viewer's field of view (orientation), the determined depth of the chair from the viewer, and so forth.

In some embodiments, the computing device 105 is configured to dynamically select one of the AR mode and VR mode based on the sensed characteristics of the environment and/or based on the story generated by the storytelling module. The selection of the AR or VR modes is represented as AR/VR mode 135 and included in memory 115. For example, if the environment is extremely bright (e.g., when the viewer is in direct sunlight), it may be difficult for a viewer to view overlaid information using the display devices 170. In another example, a virtual setting of the story generated by the storytelling/gameplay module 120 specifies a night-time setting. In these examples, the VR mode may be enabled in order to substantially isolate the viewer's field of view from the surrounding physical environment and thereby reduce the amount of light received from the environment. In both cases, dynamic selection of the AR/VR mode 145 can improve the immersive nature of the storytelling environment, whether through ensuring the user is able to suitably view the overlaid information or through providing a more realistic setting consistent with the virtual setting of the story.

Switching between AR and VR modes may be accomplished through any suitable techniques. In some embodiments, a body-worn headset includes a light-blocking assembly comprising cross polarizers that are disposed in front of each of the viewer's eyes. When one or both of the cross polarizers are rotated, the light from the physical environment that is transmitted to the viewer's eyes can be selectively reduced, and can substantially isolate the viewer's field of view from the physical environment (e.g., a VR mode). Rotating the cross polarizers may be performed manually (e.g., the viewer turns a knob linked with the cross polarizers), or electronically (e.g., a motor receives control signals from computing device 105 based on the AR/VR mode 135 and rotates the cross polarizers. In other embodiments, the light-blocking assembly includes a partially or fully transmissive "see-through" display device, such as an OLED or side-lit or naturally lit LCD. In some embodiments, when the VR mode is selected, the content displayed on the display device operates to substantially occlude environmental light. The display device receives control signals from computing device 105 based on the AR/VR mode 135 and can selectively darken the display to substantially isolate the viewer's field of view from the physical environment.

The display devices 170 are generally used within system 100 to provide a compact AR/VR display that may be carried or worn by the viewer during the interactive experience. As discussed above, the display devices 170 may include devices that are separate from the display of a mobile computing device (e.g., a smartphone or tablet device). Implementations of the compact AR/VR display that use a smartphone or other mobile computing device offer several advantages. For example, implementations able to adapt the viewer's smartphone provide a reduced manufacturing cost of the compact AR/VR display, as no separate computing hardware or display hardware need be included. A camera included in the smartphone may be used as visual sensor 166 to dynamically provide information regarding the physical environment and the viewer's field of view. Using a smartphone may also provide increased convenience to the viewer, and may provide a relatively large display for viewing.

A number of considerations influence the design of a compact AR/VR display that uses a mobile computing device. Generally, the compact AR/VR display includes an optical arrangement that is configured to transmit some or all of the display of the mobile computing device to the viewer's eyes. Depending on the currently selected mode (AR or VR), the optical arrangement is further configured to transmit some or all of the light from the physical environment to the viewer's eyes. It may be beneficial to design a compact AR/VR display to have a relatively small size and weight. Smaller and lighter body-worn implementations allow for use by younger users or other users with reduced size and/or strength, and are generally less fatiguing during the interactive experience. The positioning of the mobile computing device and/or the optical arrangement can also be selected to reduce a moment on the viewer. For example, in a head-worn compact AR/VR display, including a smartphone in a position closer to the viewer's head provides a smaller moment (e.g., corresponding to strain on the neck or upper body) than an implementation in which the smartphone is positioned further from the viewer's head. A compact (small-sized) implementation also reduces manufacturing costs through reduced material and process requirements. A compact implementation may also be more aesthetically pleasing for viewers, when compared with a large or bulky implementation.

Using a mobile computing device in conjunction with an optical arrangement can provide the viewer a reasonably good field of view, which enhances the immersive nature of the interactive environment. Generally, the size of the viewer's field of view is proportional to size of the elements included in the optical arrangement for a particular distance from the viewer's eyes.

FIG. 2 is a diagram illustrating an augmented reality (AR)/virtual reality (VR) headset configured to interact with a mobile device, according to embodiments described herein. As shown, the diagram 200 depicts a mobile device 210 and an AR/VR headset 220. The AR/VR headset 220 includes a mobile device adapter 222, a headstrap 226, and a mirrored lens 228. The mobile device adapter 222 defines an opening 224 into which the mobile device 210 is received. Generally, insertion of the mobile device 210 into the opening 224 couples the mobile device 210 with the mobile device adapter 222 and further causes the display 215 (an example of display devices 170 of FIG. 1) to be arranged with a suitable orientation relative to optical components (not shown) included in the AR/VR headset 220. The mobile device adapter 222 may include any suitable means for removably coupling with the mobile device 210. The mobile device adapter 222 is configured to hold or retain the mobile device 210 with a desired position and orientation relative to a wearer of the AR/VR headset 220.

The light produced by the display 215 of the mobile device 210 (e.g., based on display signals 175 of FIG. 1) is redirected through optical components of the AR/VR headset 220 so that the light can be seen by a wearer of the AR/VR headset 220. For example, the produced light could pass through a beam-splitter and reflect off the mirrored lens 228 and into the viewer's eyes. Thus, virtual objects displayed using the display 215 appear as if present within the physical environment of the viewer. Advantageously, by leveraging the hardware resources of the mobile device 210, the augmented reality headset 220 can be produced and sold at reduced costs, relative to other augmented reality devices containing dedicated computer processors, display devices, and so forth.

Figure 3:
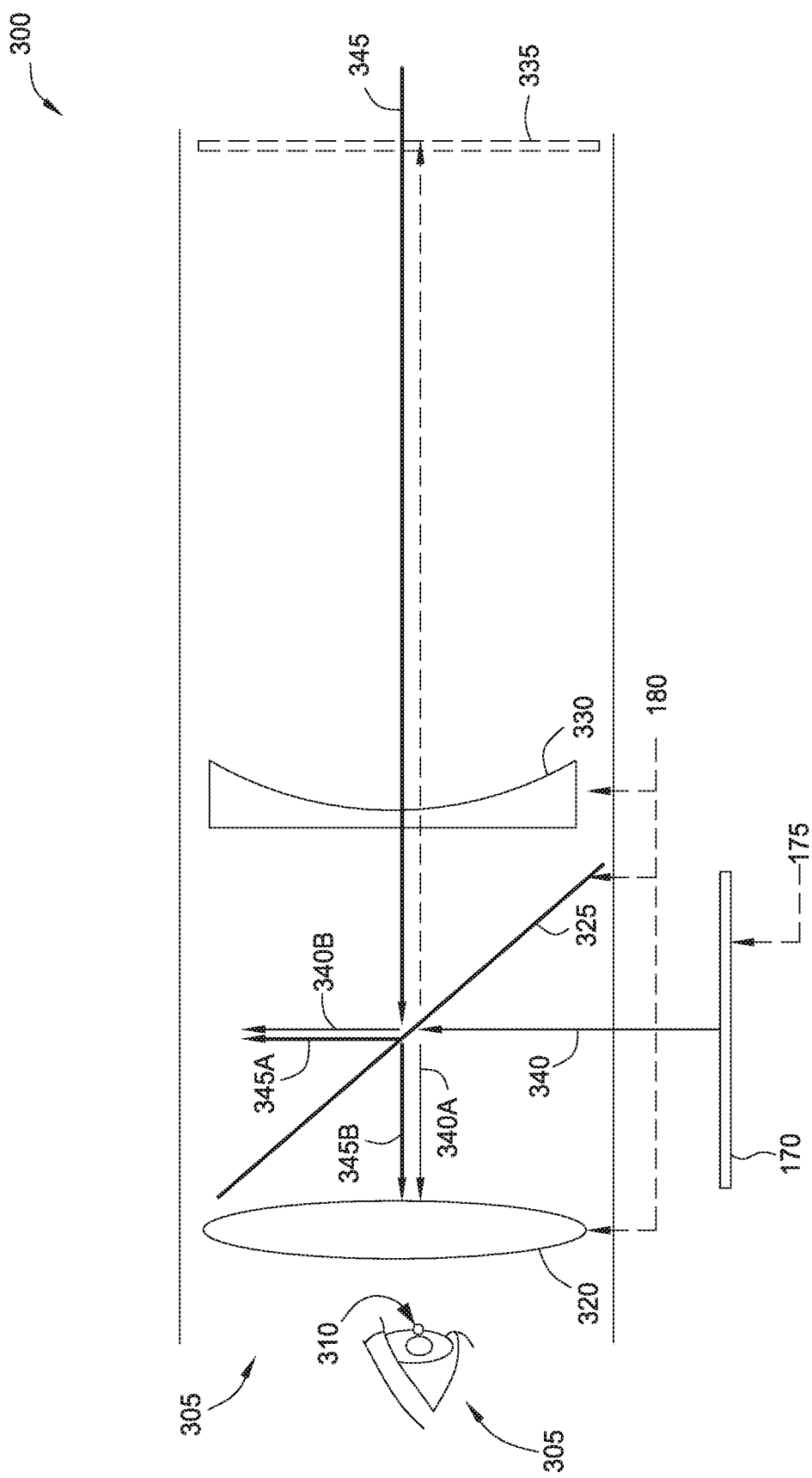
FIG. 3 illustrates an exemplary arrangement of an optical system, according to embodiments described herein.

FIG. 3 illustrates an exemplary arrangement of an optical system, according to embodiments described herein. Generally, arrangement 300 represents one possible implementation of optical components included within an AR/VR headset 220 (e.g., FIG. 2) or other body-worn or carried device. Note that the components of the arrangement 300 and their spacing are not shown to scale. Additionally, for simplicity, structural members connecting various components of the arrangement 300 are not depicted.

The arrangement 300 defines a field of view 305 relative to an optical reference point 310. As shown, arrangement 300 includes an eyepiece 320, a beam-splitter 325, and an objective 330 within the field of view 305. The arrangement 300 further includes a display device 170, which is generally configured to display images that are coupled into the field of view 305, which can be viewed from the optical reference point 310 by a viewer (represented as an eye 315). Although not shown, the arrangement 300 may further include a mask that is configured to block light from some of the display area and/or from other portions of the display device 170 to prevent these portions from being seen by the viewer. For example, a mask may be provided to prevent edges of a mobile device from being visible to the viewer, which tends to distract the viewer from the immersive nature of the interactive environment.

As shown, the display device 170 is arranged such that the light produced by the display device 170 is transmitted in the upward direction towards the beam-splitter 325. A first portion 340A of the incident light 340 is reflected toward the eyepiece 320, thereby coupling the displayed images into the field of view 305. A second portion 340B of the incident light 340 is transmitted through the beam-splitter 325. In one embodiment, the first and second portions 340A, 340B are each approximately 50% of the incident light 340. Alternate implementations of the beam-splitter 325 may have different transmissive and reflective proportions. The images from the display device 170 are focused at a first focal plane 335. In some embodiments, the first focal plane 335 is between about ten (10) inches, corresponding to a near-focus distance of the viewer's eye 315, and optical infinity.

The beam-splitter 325 is further configured to transmit a first portion 345B of incident light 345 from the environment toward the eyepiece 320, and to reflect a second portion 345A of the incident light 345.

In one alternate embodiment, the display device 170 is configured to produce polarized display images, e.g., an LCD or an OLED display including a polarizer to reduce scatter and glare. In this embodiment, the beam-splitter 325 may be polarized to reflect a greater proportion of the (polarized) incident light 340 produced by the display device 170.

The eyepiece 320 has a positive optical power and may be refractive, reflective, or diffractive. The objective 330 has a negative optical power and may be refractive, reflective, or diffractive. In some embodiments, the negative optical power of the objective 330 is complementary to the positive optical power of the eyepiece 320, such that the environment appears in focus for the viewer. Eyepiece 320 is disposed on a first side of the beam-splitter 325, while objective 330 is disposed on an opposing second side of the beam-splitter 325. Alternate embodiments of the arrangement 300 may include greater or fewer optical elements and/or different optical elements.

Figure 4:
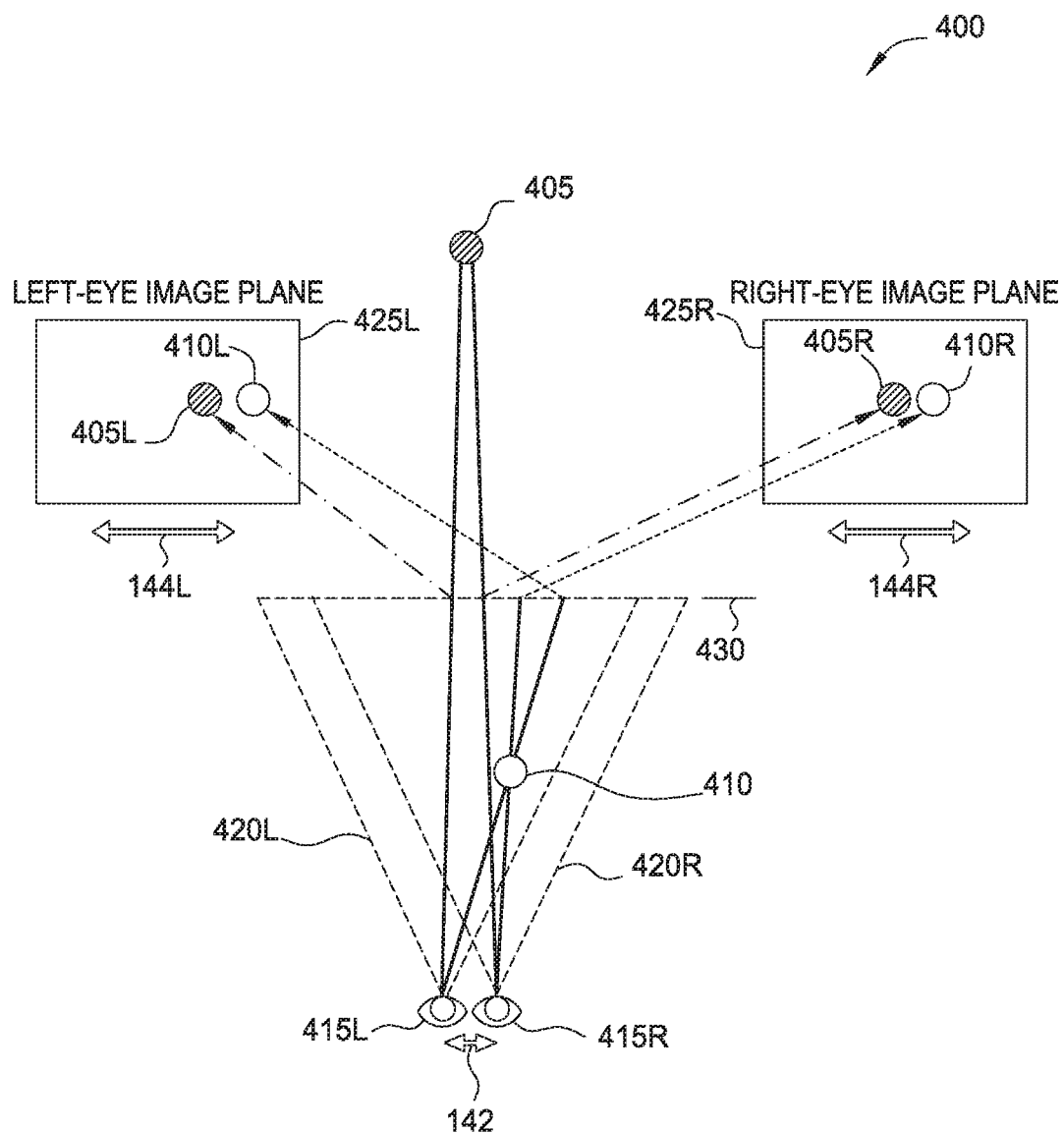
FIG. 4 illustrates displaying virtual objects at different depths, according to embodiments described herein.

FIG. 4 illustrates displaying virtual objects at different depths, according to embodiments described herein. Generally, diagram 400 depicts an exemplary operation of the AR/VR headset 200 of FIG. 2 and/or the arrangement 300 of FIG. 3.

Within diagram 400, two virtual objects 405 and 410 have different calculated depths relative to a viewer. Specifically, the virtual object 410 is depicted as being nearer to the viewer than the virtual object 405. The viewer is represented by the left and right eyes, respectively 415L and 415R, which are aligned with the optical system for a particular value of inter-pupillary distance 142.

The display device(s) of the optical system are used to generate a left-eye image plane 425L and a right-eye image plane 425R, which combined represent stereoscopic images imparting a desired depth effect of the virtual objects 405, 410 to the viewer. Viewing triangles 420L, 420R represent the field of view from the left eye 415L and right eye 415R, respectively. The viewing triangles 420L, 420R originate at the left and right eyes 415L, 415R and extend to a focal plane 430. Within diagram 400, focal plane 430 is shown as orthogonal to the page, such that focal plane 430 appears substantially as a line. The left-eye image plane 425L and right-eye image plane 425R are disposed within the focal plane 430 and partly overlap each other, and as shown in diagram 400 represent the base of the respective viewing triangle 420L, 420R.

The areal extents of the left-eye image plane 425L and the right-eye image plane 425R are also depicted in diagram 400 to illustrate the depiction of the virtual objects 405, 410 within each of the left-eye image plane 425L and the right-eye image plane 425R. The points on the focal plane 430 at which each virtual object 405, 410 is viewed by the left eye 415L are projected onto the left-eye image plane 425L as virtual objects 405L, 410L. Similarly, the points on the focal plane 430 at which each virtual object 405, 410 is viewed by the right eye 415R are projected onto the right-eye image plane 425R as virtual objects 405R, 410R.

The relative positioning of the virtual objects 405L, 410L within the left-eye image plane 425L with respect to the positioning of the virtual objects 405R, 410R of the right-eye image plane 425R determines the depths at which the viewer perceives the virtual objects 405, 410. However, in some embodiments a desired visual effect for the depicted virtual objects 405, 410 is achieved through adjusting one or more parameters associated with the viewing triangles 420L, 420R.

For example, in order to adjust a focus of virtual objects 405 and/or 410 to reflect different mental or emotional states within the interactive environment, values of horizontal skew 144L, 144R may be applied to shift the entire left-eye and/or right-eye image planes 425L, 425R within the focal plane 430. In another example, the values of horizontal skew 144L, 144R are applied to certain virtual objects 405 and/or 410 within the left-eye and/or right-eye image planes 425L, 425R to selectively adjust a focus of the virtual objects 405, 410. In another embodiment, the value of inter-pupillary distance 142 may additionally or alternately be adjusted to selectively adjust focus of virtual objects 405, 410 to achieve the desired visual effects. In another example, the optical system may actuate or otherwise adjust properties of optical components (such as lenses) of the optical system to achieve the desired visual effects.

Figure 5:
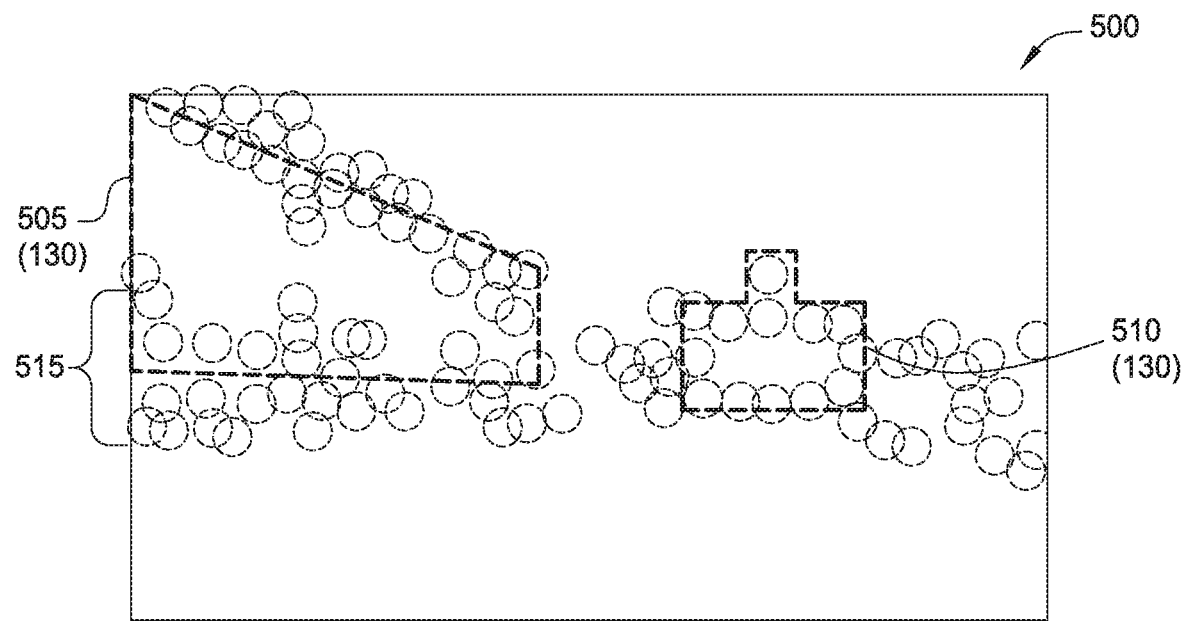
FIG. 5 illustrates an exemplary scene comprising defocused virtual objects, according to embodiments described herein.

FIG. 5 illustrates an exemplary scene comprising defocused virtual objects, according to embodiments described herein. Scene 500 depicts a street view with buildings 505, 510, which are shown in outline, as well as headlights 515. Each building 505, 510 represents one example of a virtual object 130 displayed using an AR and/or VR display. The buildings 505, 510 and headlights 515 are displayed out-of-focus to reflect a particular mental or emotional state suggested for the viewer within the interactive environment. For example, the scene 500 may suggest a dazed state or a dream state to the viewer.

Figure 6:
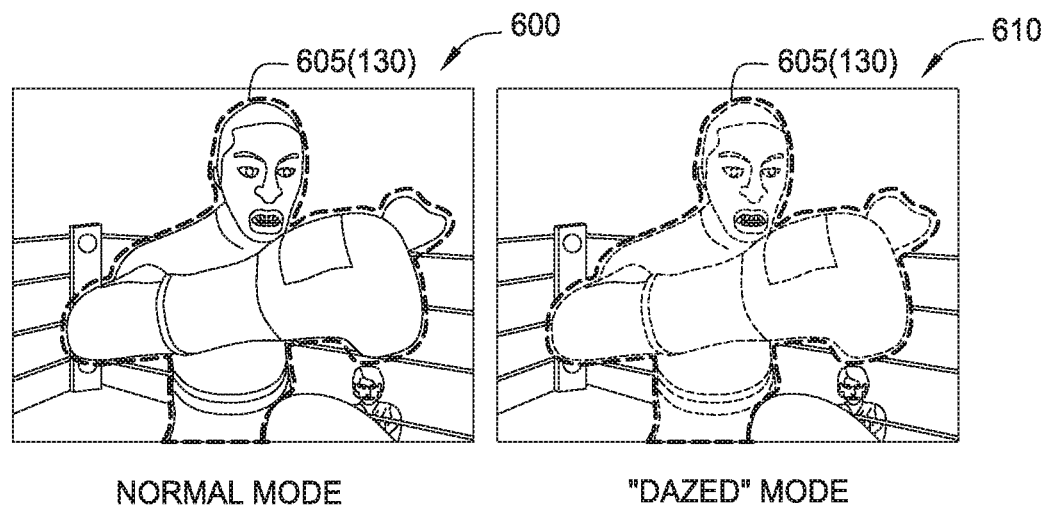
FIG. 6 illustrates an exemplary scene comprising defocused virtual objects based on mental or emotional state information, according to embodiments described herein.

FIG. 6 illustrates an exemplary scene comprising defocused virtual objects based on mental or emotional state information, according to embodiments described herein. Scenes 600, 610 generally depict a first-person view of a boxing game. Scene 600 represents a "normal" mode for the viewer, within which the opposing boxer 605 (depicted in solid outline; one example of a virtual object 130) is depicted in focus. In one embodiment, the normal mode occurs when a health level of the viewer's character (another boxer) exceeds a threshold value. Scene 610 represents a "dazed" mode for the viewer, within which at least the boxer 605 is depicted as out-of-focus with a dashed outline. In one embodiment, the dazed mode occurs when a health level of the viewer's character is less than the threshold value (e.g., when the viewer's character has been punched by the boxer 605 too many times).

Figure 7:
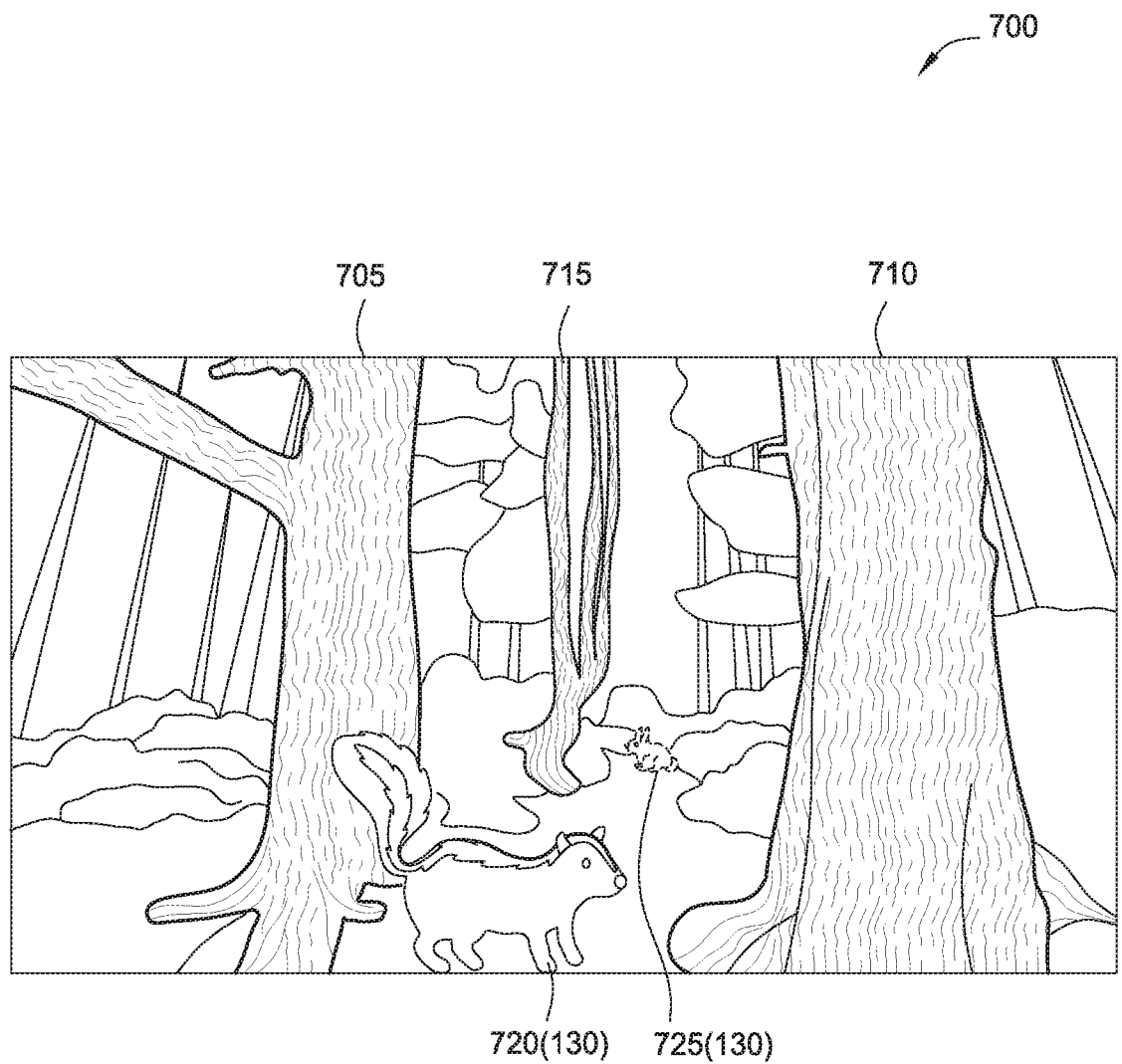
FIG. 7 illustrates an exemplary scene comprising defocused virtual objects based on the depth of the virtual objects, according to embodiments described herein.

FIG. 7 illustrates an exemplary scene comprising defocused virtual objects based on the depth of the virtual objects, according to embodiments described herein. Scene 700 generally represents an augmented reality (AR) view of a forest including trees 705, 710, 715. Scene 700 includes a skunk 720 and rabbit 725, each of which represents one example of a virtual object 130. The skunk 720 is depicted closer to the viewer than the rabbit 725. Assume for this example that skunk 720 is depicted within the eye comfort range associated with the viewer, but that the rabbit 725 is outside the eye comfort range. In some embodiments, and as shown, the skunk 720 is depicted in focus (in solid outline) while the rabbit 725 is out of focus (depicted with a dashed outline). In other embodiments, the calculated depth of the rabbit 725 is decreased to fall within the eye comfort range associated with the viewer.

Figure 8:
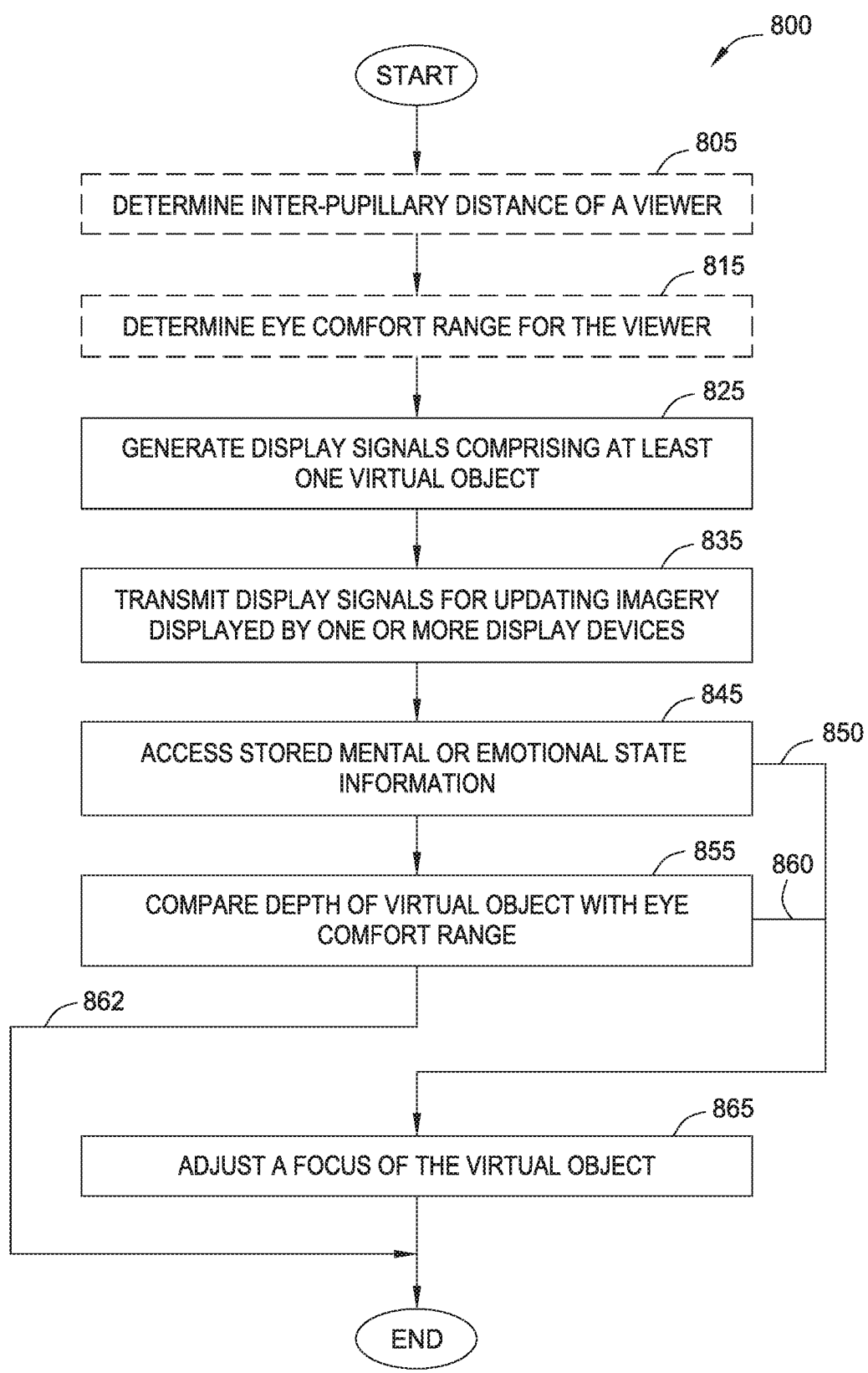
FIG. 8 illustrates a method for operating an optical system, according to embodiments described herein.

FIG. 8 illustrates a method for operating an optical system, according to embodiments described herein. Generally, method 800 may be performed by a computing device associated with an optical system capable of producing an AR and/or VR display for a viewer. Method 800 begins at an optional block 805, where the computing device determines an inter-pupillary distance of a viewer. At an optional block 815, the computing device determines an eye comfort range for the viewer. At block 825, the computing device generates signals comprising at least one virtual object. At block 835, the computing device transmits display signals for updating imagery displayed by one or more display devices.

At block 845, the computing device accesses stored mental or emotional state information. In some embodiments, the mental or emotional state information corresponds to one or more predefined emotional states that can be experienced by or suggested to the viewer within the interactive environment. The method 800 may proceed along branch 850 to block 865, where the computing device adjusts a focus of the virtual object based on the mental or emotional state information. In this case, the adjusted focus of the virtual object to suggest an altered mental consciousness of the viewer within the interactive environment.

Alternately, when the mental or emotional state information does not require the focus of the virtual object to be adjusted, the method 800 proceeds from block 845 along branch 860 to block 855, where the computing device compares a depth of the virtual object with the eye comfort range associated with the viewer. When the depth of the virtual object is outside the eye comfort range, the method 800 proceeds along branch 860 to block 865, where the computing device adjusts a focus of the virtual object. Alternately, when the depth is within the eye comfort range, the method 800 proceeds along branch 862 and method 800 ends.

In the preceding, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the preceding aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., storytelling, gameplay, or other interactive environment applications) or related data available in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method of authoring content for display using an optical system comprising one or more optical elements defining a field of view relative to an optical reference point, the method comprising:
arranging a virtual object at a first location within an authoring environment, wherein the virtual object is configured to be included in imagery displayed by one or more display devices of the optical system to appear in a focal plane within the field of view;
determining, using one or more viewer parameters that control a positioning of the virtual object on the one or more display devices, that a viewer may experience discomfort when viewing the virtual object at the first location, wherein the one or more viewer parameters comprise one of an inter-pupillary distance, a horizontal skew, or a predetermined eye comfort range defined relative to the focal plane, the predetermined eye comfort range being specific to a particular viewer and determined according to a predetermined process; and
displaying an alert responsive to determining that the viewer may experience discomfort.

2. The computer-implemented method of claim 1, wherein the one or more viewer parameters comprise the predetermined eye comfort range defined relative to the focal plane, the method further comprising:
calculating a depth of the virtual object at the first location,
wherein determining that the viewer may experience discomfort comprises determining that the calculated depth of the virtual object is outside the predetermined eye comfort range.

3. The computer-implemented method of claim 1, wherein the one or more viewer parameters comprise the inter-pupillary distance or the horizontal skew, and
wherein the one or more viewer parameters further comprise a predetermined default eye comfort range.

4. The computer-implemented method of claim 3, further comprising:
calculating a depth of the virtual object at the first location,
wherein determining that the viewer may experience discomfort comprises determining that the calculated depth of the virtual object is outside the predetermined default eye comfort range.

5. The computer-implemented method of claim 1, wherein displaying the alert comprises displaying one or more selectable options of:
a first option to remove the virtual object;
a second option to change a depth of the virtual object;
a third option to change a focus of the virtual object; or
a fourth option to leave the virtual object unmodified.

6. The computer-implemented method of claim 5, wherein selecting the third option to change the focus of the virtual object comprises:
defocusing the virtual object;
soft focusing the virtual object; and
distorting the virtual object.

7. The computer-implemented method of claim 5, wherein selecting the third option to change the focus of the virtual object comprises:
generating one or more focus control signals; and
including the focus control signals with the content when authored, such that the one or more focus control signals are transmitted to the one or more optical elements when the virtual object is displayed at the first location by the one or more display devices.

8. The computer-implemented method of claim 1, wherein the optical system is included in a body-worn device.

9. The computer-implemented method of claim 1, wherein the one or more display devices are arranged outside of the field of view, and
wherein the one or more optical elements comprise a beam-splitter configured to couple the imagery into the field of view.

10. The computer-implemented method of claim 1, wherein the one or more viewer parameters comprise the inter-pupillary distance.

11. The computer-implemented method of claim 1, wherein the one or more viewer parameters comprise the horizontal skew.

12. The computer-implemented method of claim 1, wherein the one or more viewer parameters comprise the predetermined eye comfort range defined relative to the focal plane.

13. A computer program product for authoring content for display using an optical system comprising one or more optical elements defining a field of view relative to an optical reference point, the computer program product comprising:
a computer-readable device having computer-readable program code embodied therewith, the computer-readable program code executable by one or more computer processors to:
arrange a virtual object at a first location, wherein the virtual object is configured to be included in imagery displayed by one or more display devices of the optical system to appear in a focal plane within the field of view;
determine, using one or more viewer parameters that control a positioning of the virtual object on the one or more display devices, that a viewer may experience discomfort when viewing the virtual object at the first location, wherein the one or more viewer parameters comprise one of an inter-pupillary distance, a horizontal skew, or a predetermined eye comfort range defined relative to the focal plane, the predetermined eye comfort range being specific to a particular viewer and determined according to a predetermined process; and display an alert responsive to determining that the viewer may experience discomfort.

14. The computer program product of claim 13, wherein the one or more viewer parameters comprise the predetermined eye comfort range defined relative to the focal plane, the computer-readable program code further executable to:

calculate a depth of the virtual object at the first location, wherein determining that the viewer may experience discomfort comprises determining that the calculated depth of the virtual object is outside the predetermined eye comfort range.

15. The computer program product of claim 13, wherein the one or more viewer parameters comprise the inter-pupillary distance or the horizontal skew, and wherein the one or more viewer parameters further comprise a predetermined default eye comfort range.

16. The computer program product of claim 15, the computer-readable program code further executable to:

calculate a depth of the virtual object at the first location, wherein determining that the viewer may experience discomfort comprises determining that the calculated depth of the virtual object is outside the predetermined default eye comfort range.

17. The computer program product of claim 13, wherein displaying the alert comprises displaying one or more selectable options of:

a first option to remove the virtual object;
a second option to change a depth of the virtual object;
a third option to change a focus of the virtual object; or
a fourth option to leave the virtual object unmodified.

18. The computer program product of claim 17, wherein selecting the third option to change the focus of the virtual object comprises:

defocusing the virtual object;
soft focusing the virtual object; and
distorting the virtual object.

19. The computer program product of claim 17, wherein selecting the third option to change the focus of the virtual object comprises:

generating one or more focus control signals; and
including the focus control signals with the content when authored, such that the one or more focus control signals are transmitted to the one or more optical elements when the virtual object is displayed at the first location by the one or more display devices.

20. The computer program product of claim 13, wherein the optical system is included in a body-worn device.

21. The computer program product of claim 13, wherein the one or more display devices are arranged outside of the field of view, and wherein the one or more optical elements comprise a beam-splitter configured to couple the imagery into the field of view.

22. A computer-implemented method of authoring content for display using an optical system comprising one or more optical elements defining a field of view relative to an optical reference point, the method comprising:

arranging a virtual object at a first location within an authoring environment, wherein the virtual object is configured to be included in imagery displayed by one or more display devices of the optical system to appear in a focal plane within the field of view;

determining, using one or more viewer parameters that control a positioning of the virtual object on the one or more display devices, that a viewer may experience discomfort when viewing the virtual object at the first location; and displaying an alert responsive to determining that the viewer may experience discomfort, wherein displaying the alert comprises displaying a selectable option to change a focus of the virtual object through one of defocusing, soft focusing, and distorting the virtual object.

* * * * *